US010368683B2

(12) United States Patent
Rotta et al.

(10) Patent No.: US 10,368,683 B2
(45) Date of Patent: Aug. 6, 2019

(54) MACHINE FOR THE PREPARATION OF LIQUID PRODUCTS VIA CAPSULES AND METHOD OF ASSEMBLY

(71) Applicant: LUIGI LAVAZZA S.p.A., Turin (IT)

(72) Inventors: Denis Rotta, Turin (IT); Gabriele Picone, Turin (IT); Andrea Colonna, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 128 days.

(21) Appl. No.: 15/524,439

(22) PCT Filed: Oct. 23, 2015

(86) PCT No.: PCT/IB2015/058186
§ 371 (c)(1),
(2) Date: May 4, 2017

(87) PCT Pub. No.: WO2016/071795
PCT Pub. Date: May 12, 2016

(65) Prior Publication Data
US 2018/0078081 A1 Mar. 22, 2018

(30) Foreign Application Priority Data
Nov. 6, 2014 (IT) .............................. TO2014A0920

(51) Int. Cl.
*A47J 31/36* (2006.01)
(52) U.S. Cl.
CPC ................................ *A47J 31/3633* (2013.01)
(58) Field of Classification Search
CPC .... A47J 31/407; A47J 31/3676; A47J 31/368; A47J 31/3695; A47J 31/3623; A47J 31/3628; A47J 31/3633; A47J 31/3638
See application file for complete search history.

(56) References Cited

U.S. PATENT DOCUMENTS 8,079,300 B2* 12/2011 Jing ..................... A47J 31/3638
99/289 R
8,316,759 B2* 11/2012 Ozanne ............... A47J 31/3628
426/590
(Continued)

FOREIGN PATENT DOCUMENTS

DE    10 2012 010 394    11/2013
EP    2 077 087         7/2009
WO    WO 2008/014830    2/2008

OTHER PUBLICATIONS

International Search Report and Written Opinion of the ISA for PCT/IB2015/058186, dated Apr. 12, 2016, 15 pages.
(Continued)

*Primary Examiner* — Eric Keasel
(74) *Attorney, Agent, or Firm* — Nixon & Vanderhye PC

(57) ABSTRACT

A machine (1) for the preparation of liquid products via capsules comprises a delivery assembly (2) having an actuation system that can be controlled to cause relative displacements between a first part and a second part of a preparation chamber. The actuation system comprises at least one first transmission member (13) and one second transmission member (14a). The first transmission member (13) includes two pins (13a), which are coaxial and are engaged in corresponding seats (3d), defined on respective side walls of the housing structure (3). The seats (3d) define a fixed axis of rotation of the first transmission element (13). The second transmission member (14a) is connected in an articulated way to the first transmission member (13) for turning about a movable axis of rotation, parallel to the fixed axis of rotation, and to one of the first part of chamber and the second part of chamber. The pins (13a) have, in cross section, a non-circular geometry, and the side walls of the housing structure (3) have, in homologous positions, transverse passages (3f) that extend from the seats (3d). The first (Continued)

transmission member (13) is constrained to the second transmission member (14a) so as to move in an angular range that does not include an angular position of the first transmission member (13) such that the corresponding pins (13a) would slide out transversely of the rotation seats (3d) through the aforesaid transverse passages (3f).

18 Claims, 15 Drawing Sheets

(56) References Cited

U.S. PATENT DOCUMENTS

| | | | | |
|---|---|---|---|---|
| 8,770,095 B2* | 7/2014 | Pecci | ............ | A47J 31/3633 |
| | | | | 99/295 |
| 8,978,543 B2* | 3/2015 | Baldo | ............ | A47J 31/0668 |
| | | | | 99/280 |
| 9,486,102 B2* | 11/2016 | Baldo | ............ | A47J 31/3633 |
| 2014/0102310 A1* | 4/2014 | Aardenburg | ........ | A47J 31/3676 |
| | | | | 99/295 |

OTHER PUBLICATIONS

Search Report issued in EP Appln. No. 18199107.6 dated Dec. 21, 2018.

\* cited by examiner

MACHINE FOR THE PREPARATION OF LIQUID PRODUCTS VIA CAPSULES AND METHOD OF ASSEMBLY

This application is the U.S. national phase of International Application No. PCT/IB2015/058186 filed 23 Oct. 2015, which designated the U.S. and claims priority to IT Patent Application No. TO2014A000920 filed 6 Nov. 2014, the entire contents of each of which are hereby incorporated by reference.

TECHNICAL FIELD

The present disclosure relates to machines for the preparation of beverages and liquid products in general by means of capsules. The invention has been developed with particular reference to delivery assemblies for machines of the type referred to.

PRIOR ART

Delivery assemblies for machines for the preparation of liquid products via capsules usually comprise a preparation chamber made up of two parts, at least one of which is movable with respect to the other. One part of the chamber is constituted by a capsule-holder, whereas the other part is constituted by an injector. Movement of at least one of the injector and the capsule-holder is obtained by means of a mechanical actuation system, which may be operated manually, via a lever, or else in an automated way, via an electric motor. In both of the solutions, the actuation system usually comprises a mechanism substantially of a toggle type or a mechanism comprising a rocker and at least one connecting-rod member.

Assemblage of the parts of the preparation chamber and of the mechanism inside the casing structure of the assembly is in general complex, in particular as regards the component of the mechanism operated directly by a manual lever or by a motor, which requires sturdy installation on the casing structure.

Furthermore, the majority of the mechanical stresses that arise during preparation or delivery of the liquid product are frequently discharged on the above component, with possible early wear or onset of undesirable play.

OBJECT AND SUMMARY

In its general terms, the aim of the present invention is to solve one or more of the aforesaid drawbacks in a simple and economically advantageous way. This and other aims still, which will emerge clearly hereinafter, are achieved according to the present invention thanks to a machine for the preparation of beverages and liquid products in general and a method for assembling a machine of the type referred to having the characteristics recalled in the claims. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, wherein.

DESCRIPTION OF PREFERRED EMBODIMENTS

Figure 1:
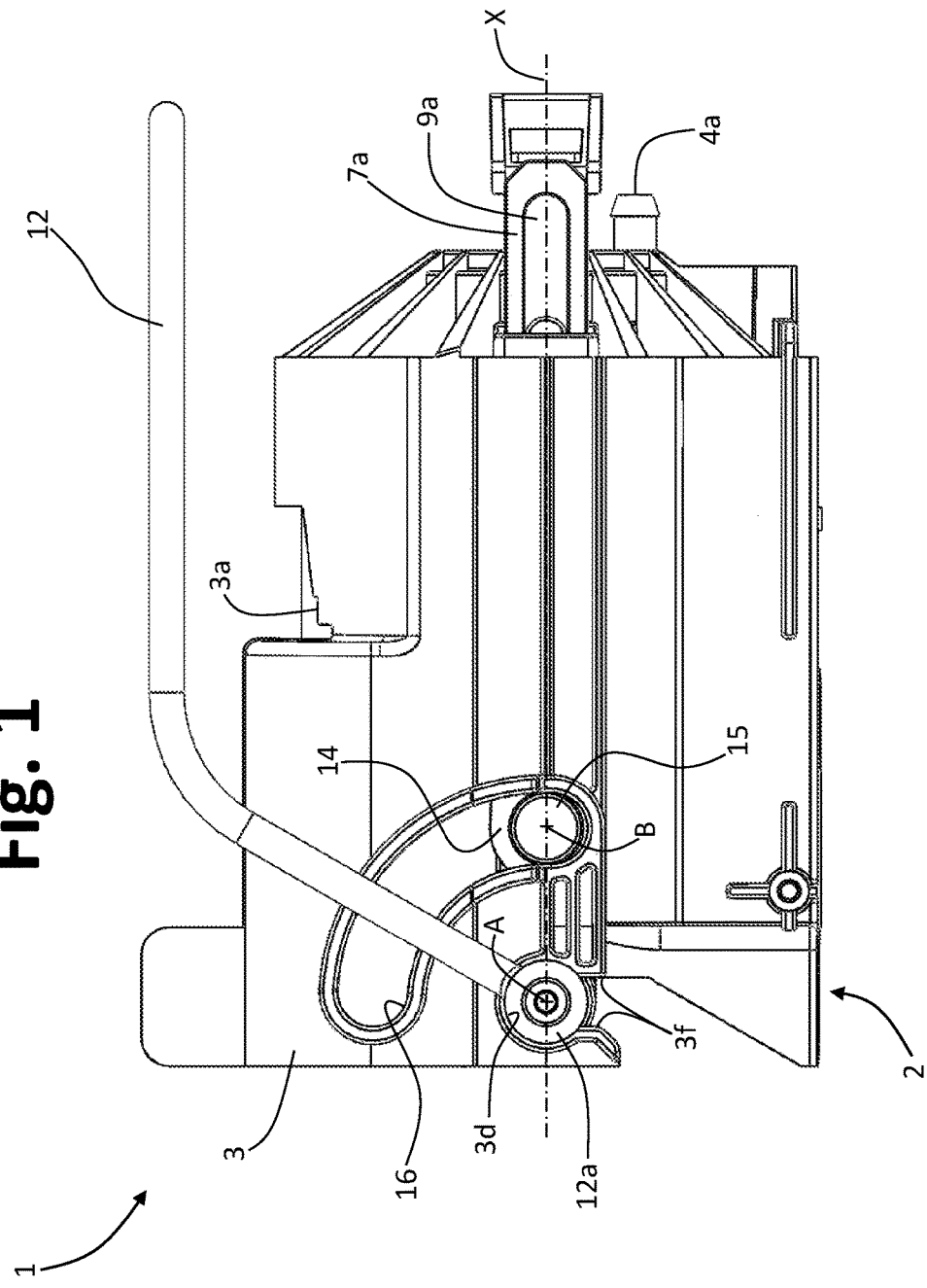
FIG. 1 is a schematic view in side elevation of a machine for the preparation of liquid products according to one embodiment of the invention.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Furthermore, particular conformations, structures, or characteristics may be combined in any adequate way in one or more embodiments. The references used herein are merely provided for convenience and hence do not define the sphere of protection or the scope of the embodiments.

It is moreover pointed out that the machine according to possible embodiments of the invention will be illustrated and described limitedly to some parts of a delivery assembly thereof, which constitutes a specific aspect of the invention, taking for granted that associated to this assembly are all the other elements in themselves known for operation of an ordinary machine for the preparation of beverages via capsules, amongst which, for example, a water tank, an electric pump, an electric heater, a user interface, etc.

Partially and schematically represented in FIGS. 1-4 is a machine 1 for the preparation of liquid products via capsules, in particular for the preparation of coffee. The machine 1 has a delivery assembly 2 having a housing structure or casing 3, located in which is a preparation chamber comprising two parts, at least one of which is movable with respect to the other. In the example illustrated, the first part includes a capsule-holder 4, defining a housing configured for receiving at least partially a capsule and delivering the liquid product obtained by means thereof, and for this purpose the capsule-holder has an outlet 4a of its own. In the example, the capsule-holder 4 is stationary and at least part of its structure is defined by the casing 3.

The second part of the infusion chamber comprises an injector device 5, referred to hereinafter for simplicity as "injector", configured for introducing into a capsule a preparation fluid, such as water and/or steam under pressure, supplied by means of a respective inlet 5a. In the example illustrated, the injector 5 is substantially coaxial with the capsule-holder 4 and is mounted so as to displace linearly inside the casing 3 according to an axis designated by X in FIG. 1, via guides of any known conception. For instance, in one embodiment, defined on each of the two opposite sides of the casing 3 is a linear guide and engaged in the two guides—which are parallel to one another and with respect to the axis X of the assembly 2—are respective lateral guide elements of the injector 5, for example the ends of a pin belonging to an actuation system of the assembly 2.

The assembly 2 comprises an inlet passage and an outlet passage for the capsules, and a supporting arrangement that comprises a supporting member which is able to keep a capsule in a position that is substantially coaxial with the capsule-holder 4 and the injector 5. The assembly further comprises guide means, configured so as to guide a capsule as far as the aforesaid position that is substantially coaxial with the two parts of the preparation chamber 4-5.

Figure 2:
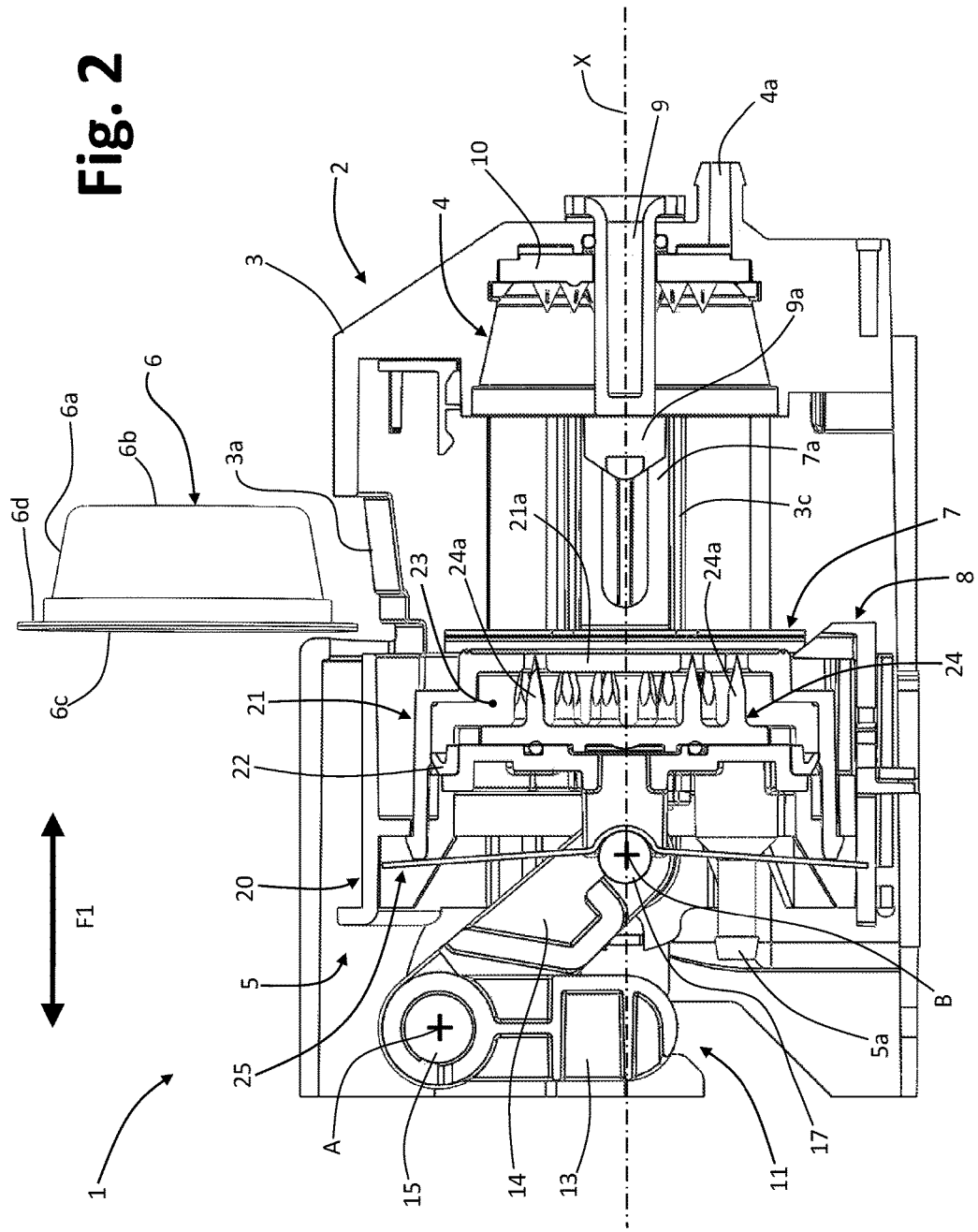
FIG. 2 is a partial and schematic longitudinal section of a machine according to one embodiment of the invention, in a first condition.

A capsule that can be used in the assembly 2 is designated by 6 in FIG. 2. In the example, the capsule 6, of a conception in itself known, has a substantially cup-shaped body, with a peripheral wall 6a and a bottom 6b, and a closing wall 6c opposite to the bottom 6b, preferably formed by a sealing foil. The body 6a defines, at its mouth opposite to the bottom 6b, a flange 6d on which the closing wall 6c is fixed, for example via heat sealing. Housed inside the cup-shaped body is a dose of a precursor that is able to form a liquid product via a preparation fluid, such as water and/or steam under pressure, the precursor comprising, for example, ground coffee.

In one embodiment, such as the one exemplified in the figures, the casing 3 has, in its top part, an entry opening 3a, which provides the aforesaid inlet passage. In the example, the profile of the opening 3a substantially corresponds to the cross section of the capsule 6 so as to enable guided introduction thereof with relative precision into the assembly 2. To the opening 3a there corresponds, in the lower part of the casing 3, an opening for discharging the capsule, which is partially visible for example in FIG. 4, where it is designated by 3b.

The aforesaid guide means for the capsule are located at generally opposite side parts of the injector 5 and are configured for constraining a capsule 6 laterally. These means may be of any type known in the sector. In the example illustrated, the guide means comprise two generally vertical guides 7, which are located a little beyond the front of the injector 5. Each guide 7 has a respective first portion generally facing the front of the injector 5 so as to delimit with the latter a sliding space for the flange 6d of the capsule 6. The guides 7 are preferably movable together with the injector 5. For this purpose, the guides 7 may be fixed to the body of the injector 5 or else be configured as distinct components, but fixed in motion with respect to the injector. In one embodiment, for example, each vertical guide 7 is fixed with respect to a respective sliding element 7a (see also FIG. 5) that is engaged in a corresponding horizontal guide defined in a respective side of the casing 3; one such guide is designated, for example, by 3c in FIG. 2. As may be appreciated, for example, in FIGS. 2 and 4, with the injector in its initial position, i.e., where it set at a distance from the capsule-holder 4, the vertical guides 7 are located underneath the entry opening 3a so as to be able to receive the flange 6d of the capsule 6.

Provided at the lower part of the injector 5, preferably in a central position, is the aforementioned supporting member, designated as a whole by 8. Operation of this member is substantially similar to what is described in WO 2012/168917 A, filed in the name of the present applicant, to which the reader is referred.

Preferably, the assembly 2 also includes means for extraction or expulsion of a spent capsule from the housing defined by the capsule-holder 4. These means may be of any type known in the sector. In one embodiment, such as the one exemplified in the figures, these means include an ejector member 9, which is mounted movable in an opening provided in the bottom of the capsule-holder 4. The specific construction and the modalities of actuation of the ejector member 9 are irrespective of the purposes of the invention, and consequently will not be described herein. In the example of embodiment illustrated, the ejector member 9 has associated two lateral connection arms, designated by 9a (see also FIG. 5), set generally parallel to the sliding elements 7a that are fixed with respect to the vertical guides 7 and coupled thereto. The sliding elements 8 and the arms 9a are able to slide through respective front slits (not shown), defined on the front of the casing 3 and axially aligned to the guides 3c. In this way, movement of the injector 5 and of the sliding elements 7a causes movement of the connection arms 9a, and hence of the ejector member 9.

To the bottom wall of the capsule-holder 4 there may be associated a perforation device, comprising one or more tips or reliefs. Once again with reference to the example illustrated, one such perforation device, which is also of any known type, is designated by 10 and has a central passage for the ejector member 9. Irrespective of the specific conformation of such a device 10, the liquid that flows out of the capsule 6, which is torn at the bottom by the aforesaid tips, can reach the passage 4a. The latter may be connected, for example via a suitable duct, to a nozzle for delivery of the liquid product. The invention may in any case be applied also to the case of delivery assemblies for capsules having a pre-perforated bottom wall, in which case it is not necessary to provide a perforation device inside the capsule-holder 4.

Displacement of the injector 5 in the two opposite directions indicated by the arrow F1 of FIG. 2 is obtained by means of an actuation system, designated as a whole by 11. In various embodiments, the actuation system 11 comprises a mechanism including a rocker and at least one connecting-rod member, for example one that may be operated manually by a user via a purposely provided lever, of the same type as the one designated by 12 in FIG. 1. In other embodiments, the actuation mechanism may include gears or an electric driving motor.

Figure 5:
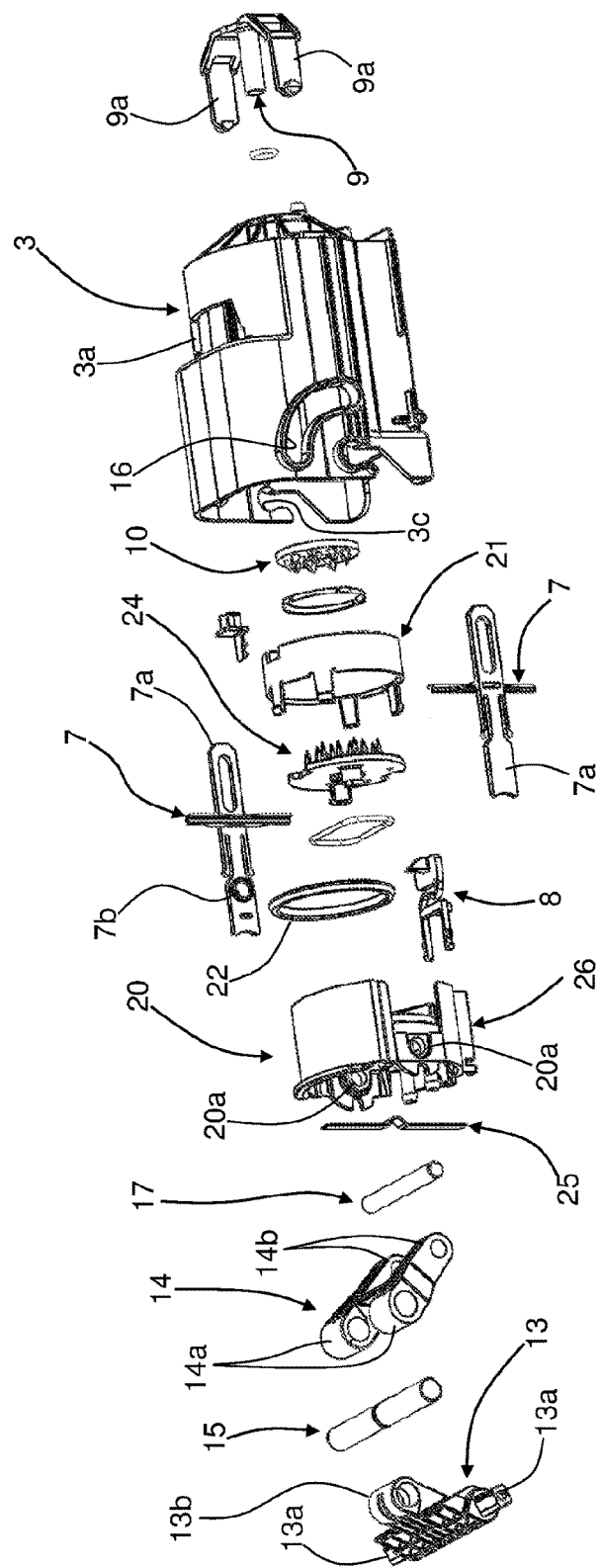
FIG. 5 is an exploded schematic view of some parts of a delivery assembly of a machine according to one embodiment of the invention.

In one embodiment, the actuation system 11 comprises at least one first transmission member and one second transmission member, each having two generally opposite connection portions. With reference also to FIG. 5, in the embodiment exemplified, the aforesaid first transmission member includes a rocker 13, i.e., a transmission member constrained to an oscillation between two fixed positions. In the example, a first connection portion of the rocker 13 includes two side pins 13a, which are coaxial and are fixed in rotation with respect to the rocker itself. In the example illustrated, the projecting pins 13a (see also FIG. 10) are made of a single piece with the body of the rocker 13, but not excluded from the scope of the invention is the case of a single pin configured as an additional part of the rocker, driven or keyed into its body, the projecting ends of which provide the pins 13*a*.

Figure 10:
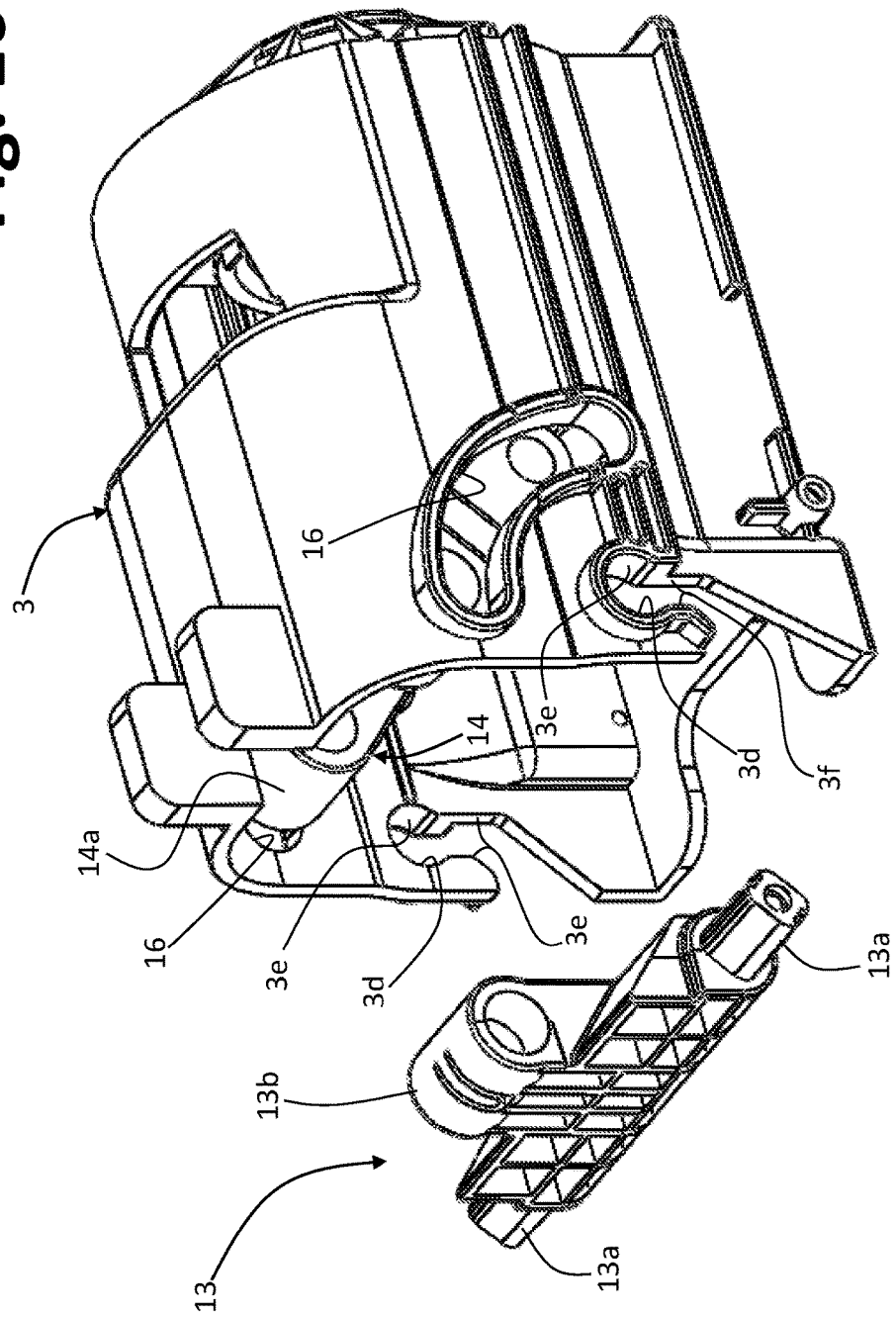

The pins 13*a* are designed to be rotatably constrained in respective rotation seats 3*d*, visible for example in FIG. 10, defined in the two opposite side walls or sides of the casing 3, which are generally set parallel to one another. These rotation seats 3*d* each have a surface of rotation 3*e* with which an external profile of the respective pin 13*a* cooperates for defining a fixed axis of rotation of the rocker 13; this fixed axis is designated by A in FIGS. 2 and 6. Associated to the aforesaid pins 13*a* are the ends of the lever 12, one of which is designated by 12*a* in FIG. 1.

With reference once again to FIG. 5, a second connection end 13*b* of the first transmission member, i.e., of the rocker 13, is connected in an articulated way to a first connection end 14*a* of a second transmission member 14 so that the latter can turn according to a movable axis of rotation, parallel to the fixed axis of rotation A. In the example illustrated, the second transmission member 14 is thus a connecting-rod member, i.e., a transmission member that is able to perform rotational and translational movement.

Figure 6:
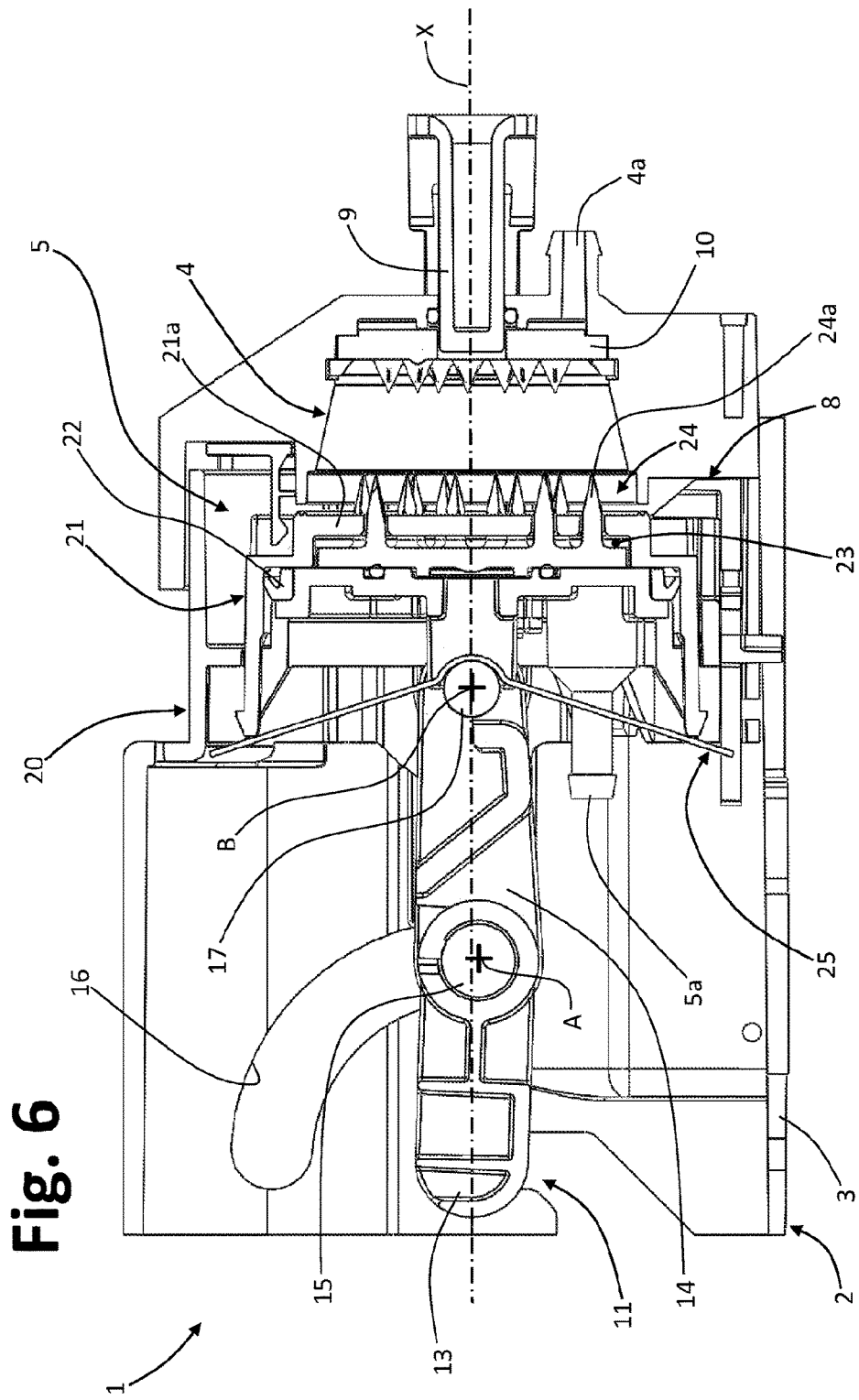
FIGS. 6 and 7 are views like those of FIGS. 2 and 3, with the machine in a second condition.

In the example, the portions 13*b* and 14*a* of the rocker and of the connecting-rod member 14 are connected by means of a connection pin 15 that, as will be seen, identifies the aforesaid movable axis of rotation, designated by B in FIGS. 2 and 6. For this purpose, the aforesaid portions 13*b* and 14*a* define respective through seats or eyelets for the pin 15.

The rocker 13 is constrained to the connecting-rod member 14 so as to move in a predefined angular range. For this purpose, in a preferred embodiment, the aforesaid angular range is determined by a pair of guides with a development shaped as an arc of a circumference, defined in homologous positions on the side walls of the casing 3; one of these guides is designated by 16, for example, in FIGS. 1, 5, and 10. In the embodiment illustrated, the two opposite ends of the pin 15 project laterally from the portion 14*a* of the connecting-rod member 14 and each engage a respective guide 16. Preferably, the aforesaid guides 16 with arc-shaped development are provided by through slits present in the side walls of the casing 3.

The second transmission member, i.e., the connecting-rod member 14, has a second connection portion, designated by 14*b* in FIG. 5, which is connected in an articulated way to the injector 5. In a preferred embodiment, for this purpose, connection between the portion 14*b* of the connecting-rod member 14 and the injector 5 is obtained via a connection pin 17. Also the aforesaid second portion 14*b* defines respective seats or eyelets for the pin 17.

In the example of embodiment illustrated, the two opposite ends of the pin 17 project on opposite sides of the body of the injector 5, with the latter that is constrained to a linear reciprocating movement within the casing 3, between its spaced apart position and the close with respect to the capsule-holder 4. For this purpose, as has been mentioned, the linear guides 3*c* are provided, configured, for example, in the form of rectilinear slots on the inside of the side walls of the casing 3. For instance, in a preferred embodiment, each end of the pin 17 is coupled to one of the sliding elements 7*a*, which is purposely provided with a corresponding seat 7*b* (FIG. 5). In this way, via the actuation system 11 the linear movements of the injector 5, of the guides 7, and of the ejector member 9 can be brought about. According to other embodiments (not represented), the ends of the pin 17 are inserted directly into the corresponding linear guides 3*c*, or portions of the body of the injector 5 are inserted into the guides 3*c*.

As may be inferred, for example, from FIG. 2, the axes of rotation of the actuation system 11 identified by the pins 13*a* of the rocker 13 and by the pins 15 and 17 are hence substantially perpendicular to the direction of linear displacement F1 of the injector 5 with respect to the capsule-holder 4.

With reference, in particular, to the embodiment illustrated in FIGS. 2-5, the injector 5 has a generally hollow body that includes at least one first body part 20 and one second body part 21, which is axially slidable with respect to the first body part 20, the two parts being mounted preferably in a substantially telescopic way with a sealing member 22 set in between. In the example illustrated in the figures, the axis of sliding between the body parts 20 and 21 substantially corresponds to the axis X of displacement of the injector 5 with respect to the capsule-holder 4. In what follows, for simplicity, the parts 20 and 21 will be defined as "injector body" and "lid", respectively. In one embodiment, such as the one exemplified, the injector body 20 is approximately cylindrical and has, on two opposite sides, circular through seats 20*a* (FIG. 5), which can be engaged by the pin 17 connected to the connecting-rod member 14. Also the lid 21 has a substantially cylindrical hollow shape, with an end wall 21*a* that basically provides a front wall of the injector 5.

Figure 7:
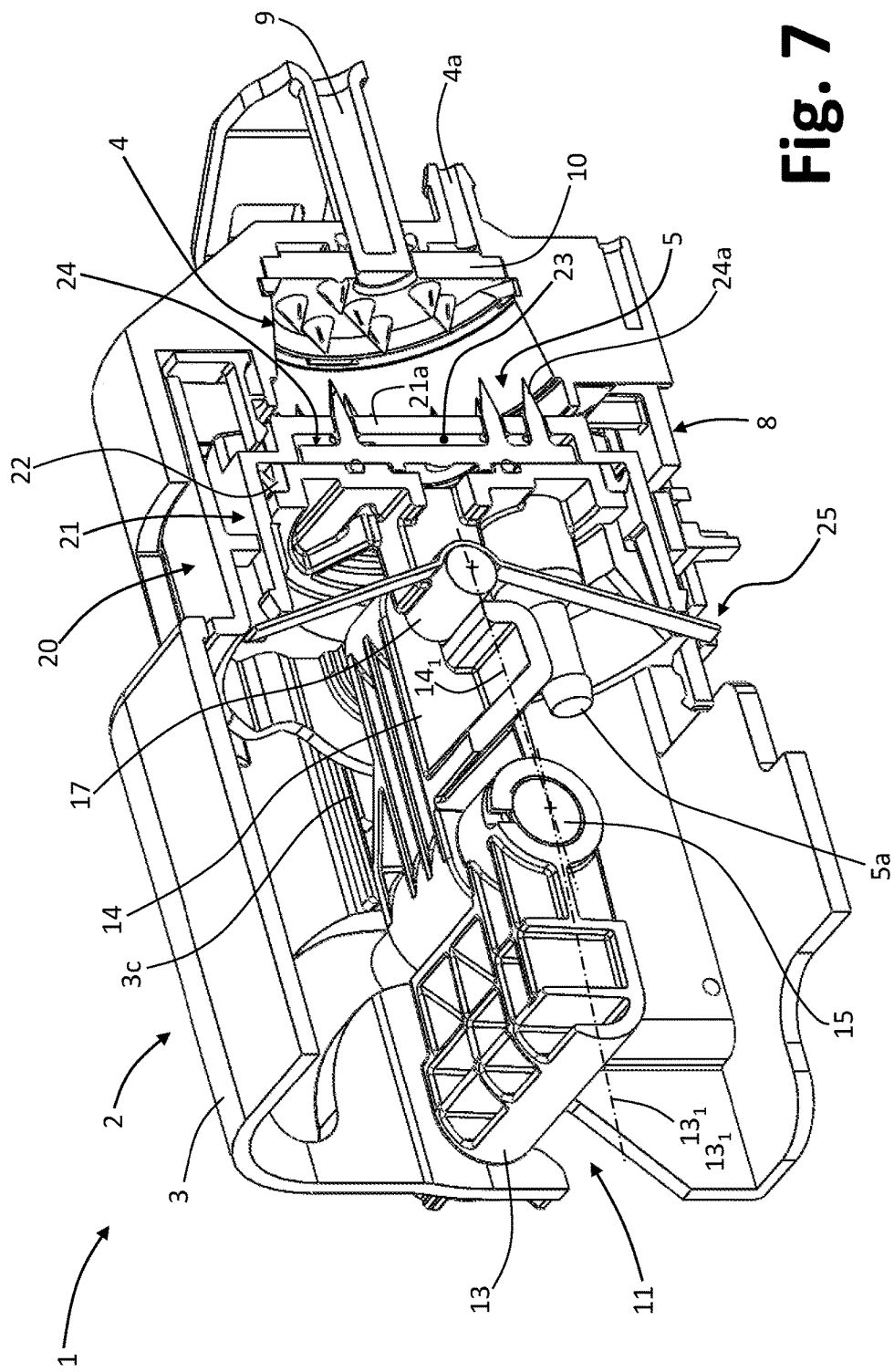

The general structure of the injector may be of any type known in the sector and for this reason will not be described in detail. In the non-limiting example illustrated, defined between the injector body 20 and the lid 21 is a chamber 23, at least partially housed in which is a perforation device, designated as a whole by 24, having a plurality of front perforating elements that are axially aligned to respective through holes defined in the front wall 21*a* of the lid 21. The lid 21 is able to slide against the action of elastic means from an advanced position (visible in FIGS. 2-4) to a retracted position (visible in FIGS. 6-7). In an advantageous embodiment, such as the one illustrated in the figures, the aforesaid elastic means comprise a bending spring 25, in particular a flat or leaf spring, which extends in a direction transverse to the direction of axial sliding X of the lid 21 with respect to the injector body 20. In the aforesaid advanced position of the lid 21 (see FIGS. 2-4), the tips 24*b* of the perforation device 24 do not project substantially beyond the front wall 21*a* of the lid. Instead, in the aforesaid retracted position (see FIGS. 6-7), the tips 24*b* project in a substantial way beyond the wall 21*a* in order to be able to perform their perforating function. On the other hand, the inventive aspects described hereinafter may be applied also to delivery assemblies provided with an injector 5 without a perforation device for the production of machines designed to operate with capsules having a pre-perforated front wall.

The casing 3 of the assembly is configured so as to simplify and speed up assemblage of the first transmission member, here represented by the rocker 13. A possible assembly sequence will be described hereinafter, limitedly to the aspects of immediate interest for understanding of an aspect of the invention.

Figure 8:
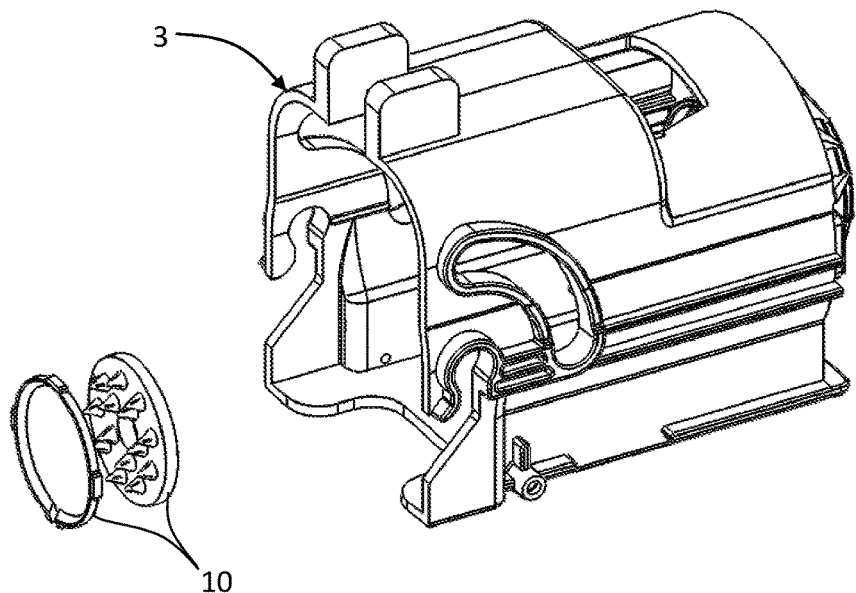
FIGS. 8, 9, and 10 are schematic perspective views aimed at exemplifying some steps of a method for assembling a delivery assembly of a machine according to one embodiment of the invention.

FIG. 8 exemplifies assembly of the perforation device 10, when this is envisaged, within the casing 3 of the assembly. As has been mentioned previously, in a preferred embodiment, a substantial part of the capsule-holder 4 is made of a single piece with the casing 3, for example of moulded plastic material. For such a case, then, the parts that make up the perforation device 10 are positioned in the capsule-holder and secured thereto.

Figure 9:
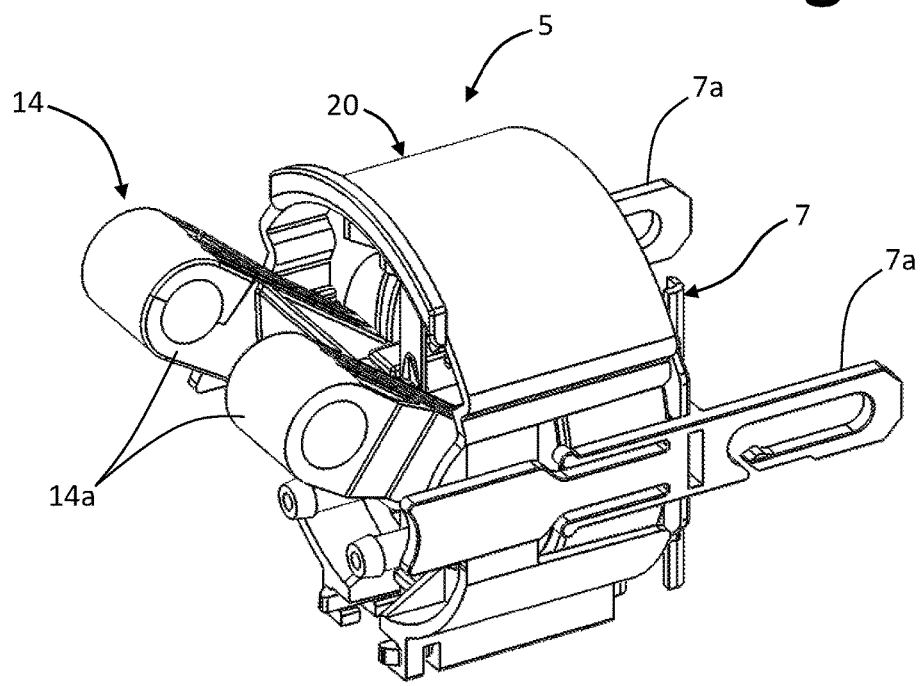

FIG. 9 exemplifies a step of assembly of the injector 5. Positioned in the back of the pre-assembled injector 5 is the second connection part of the connecting-rod member 14, in such a way that the eyelets of the corresponding portion 14*b* are aligned with the holes 20*a* of the body part 20 of the injector (see FIG. 5). The pin 17—which is not visible in FIG. 9 either—is inserted through the holes 20*a*, thus constraining the injector 5 in an articulated way to the connecting-rod member 14. Associated to the opposite ends of the pin 17 are the sliding elements 7*a*, via the corresponding seats 7*b* (FIG. 5). On the front side of the casing 3, the ejector member 9 is inserted in the corresponding passage defined at the bottom of the capsule-holder 4, with interposition of a seal ring, and the corresponding actuation arms 9*a* are inserted in the aforementioned slits, axially aligned to the linear guides 3*c* (FIGS. 2-3), defined on the inside of the side walls of the casing 3. The ensemble visible in FIG. 9 that comprises the injector 5, the connecting-rod member 14, the pin 17, and the sliding elements 7*a* is then inserted into the cavity of the casing 3, with the elements 7*a* engaged in the corresponding guides 3*c*, and then coupling is made between the elements 7*a* and the actuation arms 9*a* of the ejector member. In one embodiment, for example, the arms 9*a* have on the inside tapered pins that substantially couple by snap-action in slots defined in the sliding elements 7*a*. Next, the rocker 13 is coupled to the casing 3.

According to a characteristic of the invention, the fixed pins 13*a* of the rocker have, in cross section, a non-circular geometry, and the side walls of the casing 3 have, in homologous positions, transverse passages that extend each starting from a respective rotation seat 3*d* and are designed to enable insertion of the pins 13*a* in the above seats 3*d*. In one embodiment, the aforementioned passages have a dimension of width that is at least slightly greater than a dimension of width of the pins 13*a* of the rocker 13, or in any case a width sufficient to enable displacement of the pins 13*a* within the aforesaid passages, in a direction transverse to the axis of the rotation seats 3*d* and right into the latter.

In the embodiment exemplified in the figures, the pins 13*a* have a substantially rectangular cross section, i.e., with a minimum dimension of width and a maximum dimension of width. This shape is not, however, to be understood as essential, it being possible for the pins 13 also to have a different cross section provided that each defines at least areas for sliding on the surfaces of rotation 3*e* of the corresponding rotation seats 3*d*. The cross section of the pins 13*a* could hence also be square, triangular, or polygonal or may even be elliptical.

FIG. 10 shows the seats 3*d*, with the respective surfaces of rotation 3*e*, here defined in part also by local reinforcement and guide thickened portions of the side walls of the casing 3. The rotation seats 3*d* are substantially slotted seats, in the sense that extending from them are the aforesaid transverse passages, designated by 3*f*, which in the example illustrated, reach a rear edge of the side walls of the casing 3. As may be seen, then, the surfaces of rotation 3*e* of the seats 3*d* have a development of less than 360°, given the presence of the passages 3*f*. In the example, the seats 3*d* and the passages 3*f* are defined through the respective side walls of the casing 3 (as through openings), but this does not constitute an essential characteristic of the invention. The seats 3*d* and the passages 3*f* could in fact be configured as slots of the side walls of the casing. Also the fact that the transverse passages 3*f* open at their proximal end at an edge of the side walls of the casing 3 does not constitute an essential characteristic. Each end could in fact open in a position corresponding to a widened portion of the casing 3 intermediate between the seats 3*d* and the rear edge of the side walls of the casing, with a view to enabling insertion of the pins 13*a* into the passages 3*f*.

As has been mentioned, preferably the width of the passages 3*f* is slightly greater than the width or minimum dimension of the cross section of the pins 13*a*, or in any case such as to enable sliding—even with slight interference—of the pins in the passages. The pins 13*a* have, in the example illustrated, a substantially rectangular cross section. In actual fact, as may be appreciated, for example, in FIGS. 16-18, it is preferable in the case of pins 13*a* with polygonal cross section for them to have axial slots in such a way that the corresponding external profile will define only some localized areas for sliding on the surfaces of rotation 3*e*.

Thanks to the presence of the passages 3*f*, the pins 13*a* can be inserted transversely into the corresponding seats 3*d* precisely by sliding them into the aforesaid passages in a direction transverse to the axis of the seats 3*d* and of the pins 13*a*. In order to render possible insertion and sliding of the pins 13*a* in the passages 3*f*, the former must, however, be set in a given angular position with respect to the latter, as clarified hereinafter.

Figure 11:
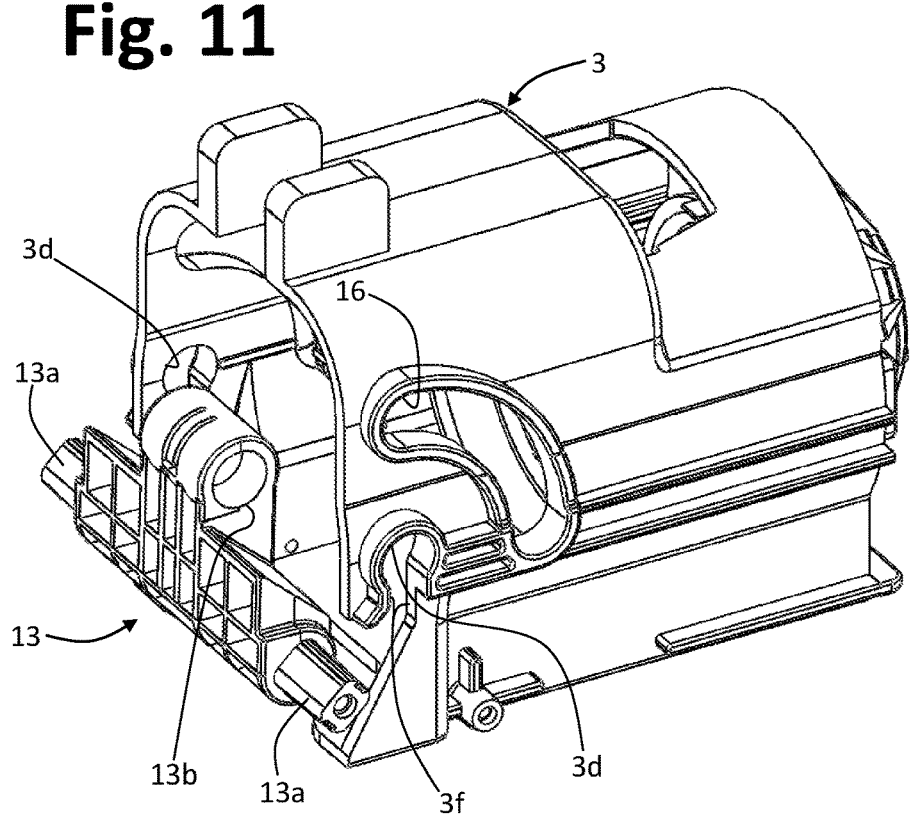
FIGS. 11-12 are a schematic perspective view and a partial and schematic side view of the delivery assembly of FIGS. 8-10, in successive steps of the method of assembly.
Figure 12:
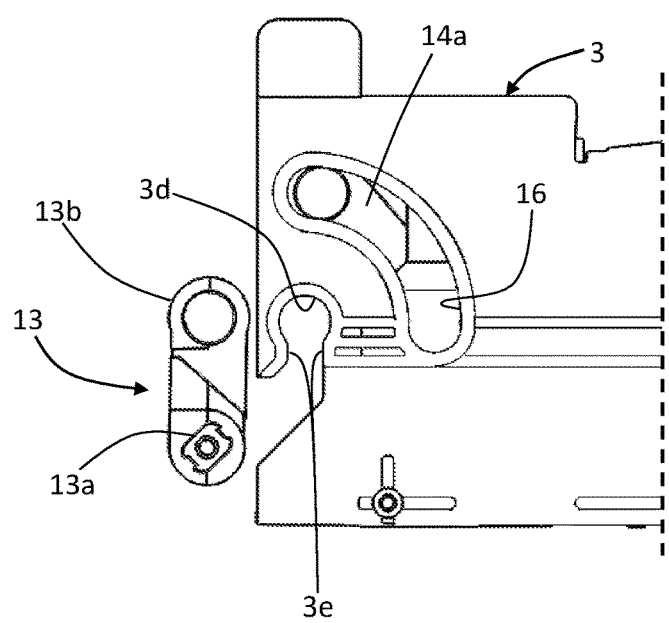
Figure 13:
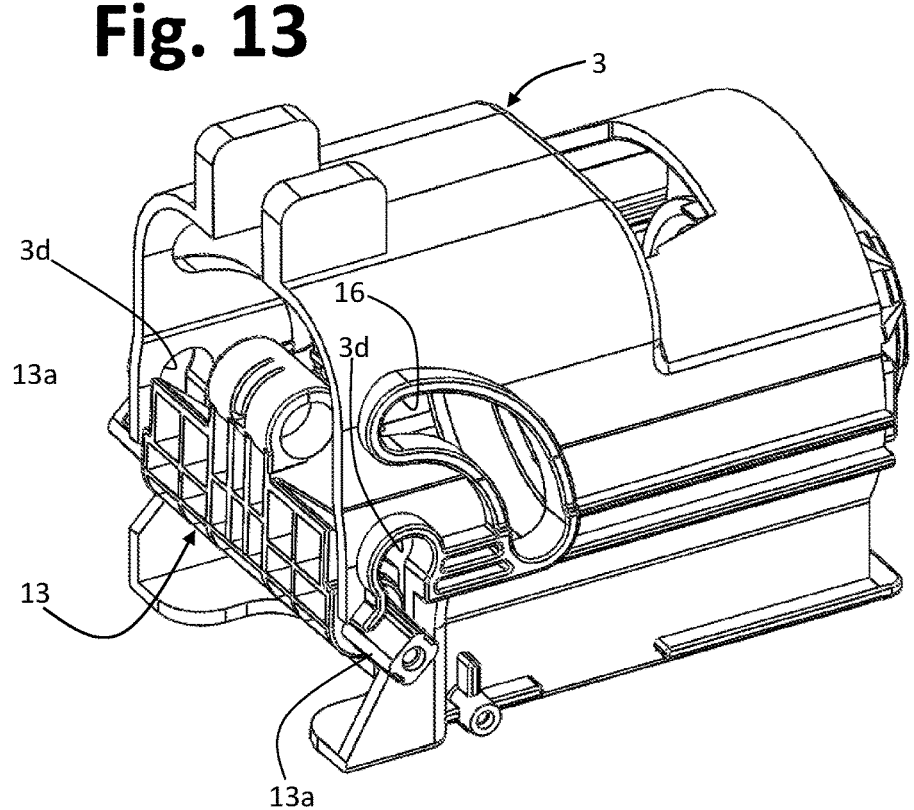
FIGS. 13-14, 15-16, 17-18, and 19-20 are views like those of FIGS. 11-12, which regard successive steps of the method of assembly.
Figure 14:
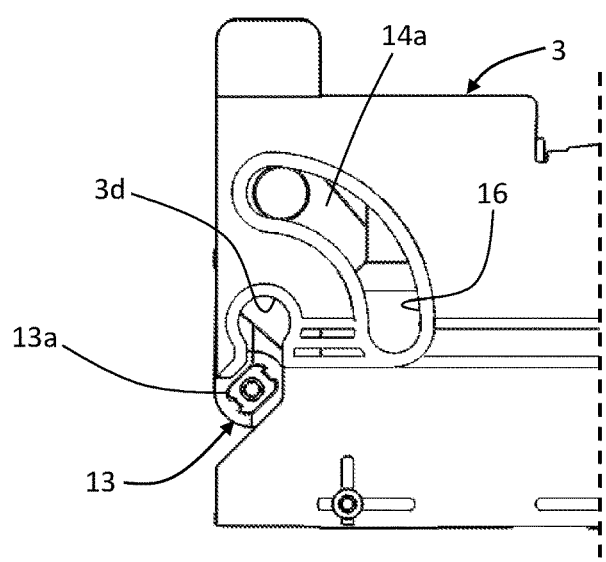

FIGS. 11-12 illustrate a generic step of approach of the rocker 13 to the back of the casing 3. In the preferred example illustrated, the passages 3*f* have a proximal end (i.e., the one that opens at the rear edge of the walls of the casing 3) that is generally flared in order to facilitate insertion of the pins 13*a* into the passages 3*f*. FIGS. 11-12 illustrate the rocker 13 in an angular position such that the pins 13*a* can be easily introduced partially into the flared part, which represents the wider portion of the transverse passages. FIGS. 13-14 illustrate precisely the step of partial introduction of the pins 13*a* into the flared part of the passages 3*f*; the narrower part of the passages 3*f* connects this flared part to the seats 3*d*.

Figure 15:
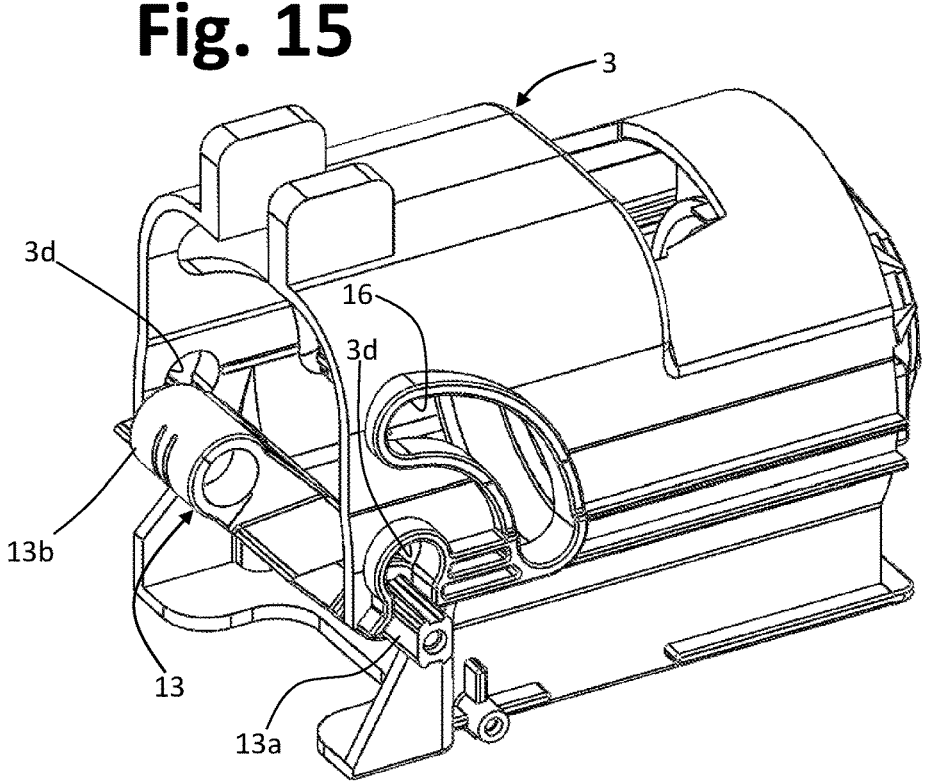
Figure 16:
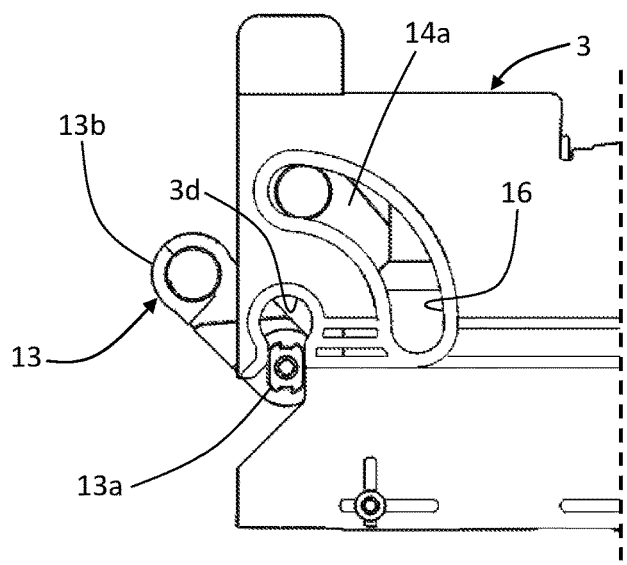

FIGS. 15-16 illustrate the rocker 13 oriented in the aforesaid given angular position with respect to the passages 3*f*, where, in this position, the pins 13*a* can be inserted into the corresponding passages 3*f* and can be displaced therein until they occupy the rotation seats 3*d*. As may be appreciated, in this step, the rocker 13 is positioned at an angle so that the major surfaces of the pins 13*a* (i.e., the surfaces that identify between them the minimum dimension or dimension of width of the pins themselves) are parallel or in any case correspond to the facing surfaces of the narrowest stretch of the passages 3*f*. As may be noted, in this angular position of the rocker 13, its connection portion 13*b* is on the outside of the cavity of the casing 3 or in any case in a position not suitable for its connection with the connection portion 14*a* of the connecting-rod member 14.

Figure 17:
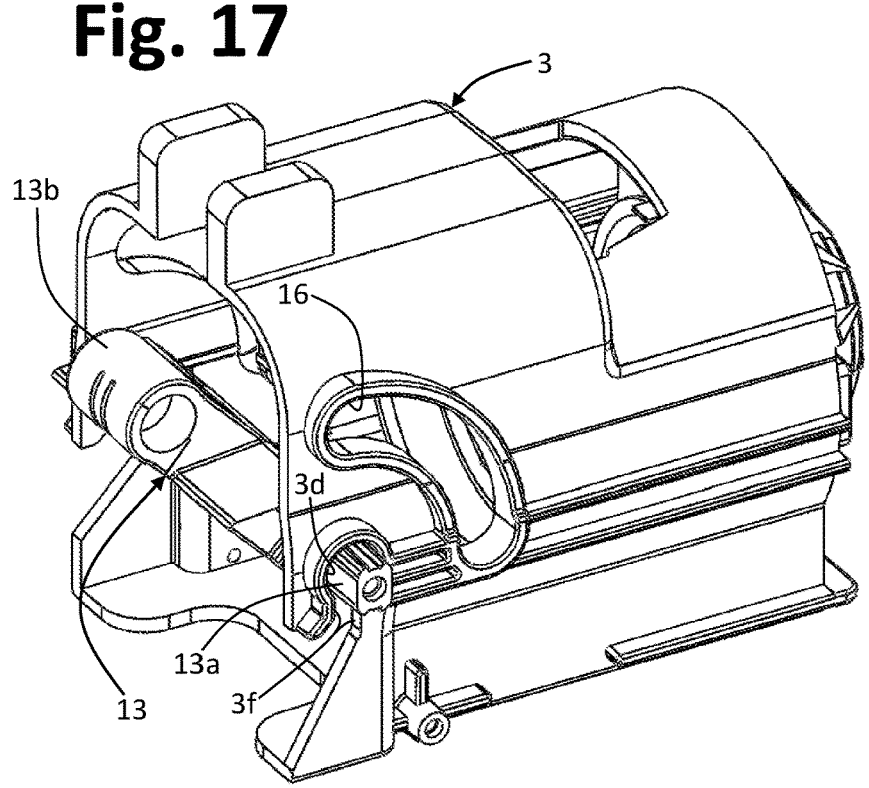
Figure 18:
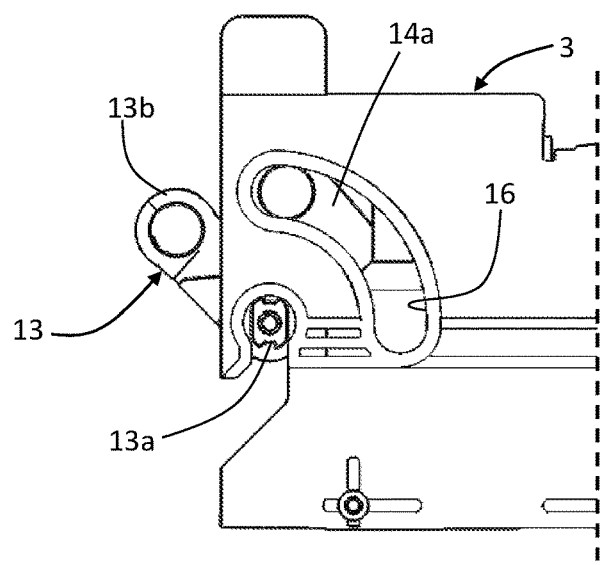

In FIGS. 17-18 the rocker is still in the angular position of FIGS. 15-16, but is illustrated following upon an upward translation thereof, i.e., a sliding of its pins 13*a* within the narrow stretches of the transverse passages 3*f*. Following upon this translation, the pins 13*a* reach the rotation seats 3*d*. In this step, the connection portion 13*b* of the rocker is still in a position not suitable for connection with the portion 14*a* of the connecting-rod member.

Figure 19:
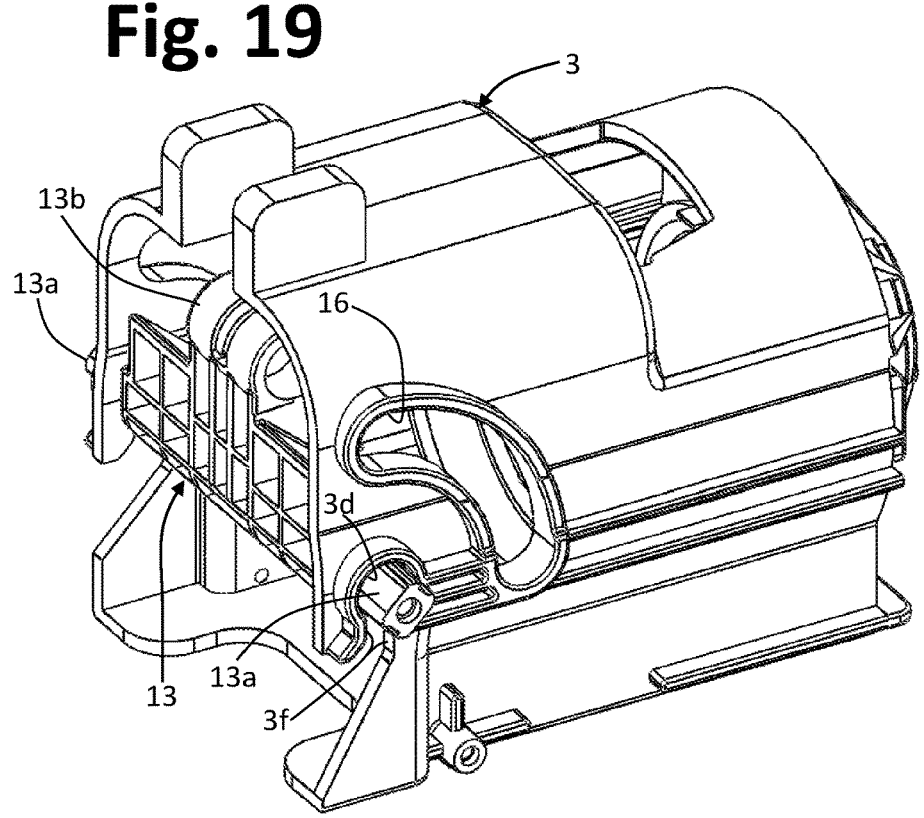
Figure 20:
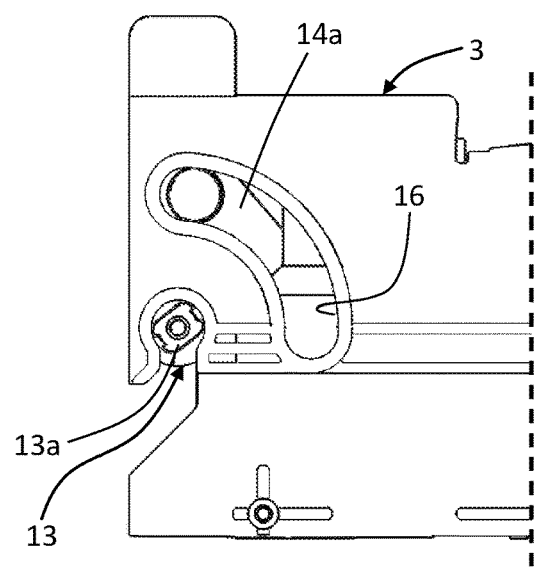
Figure 21:
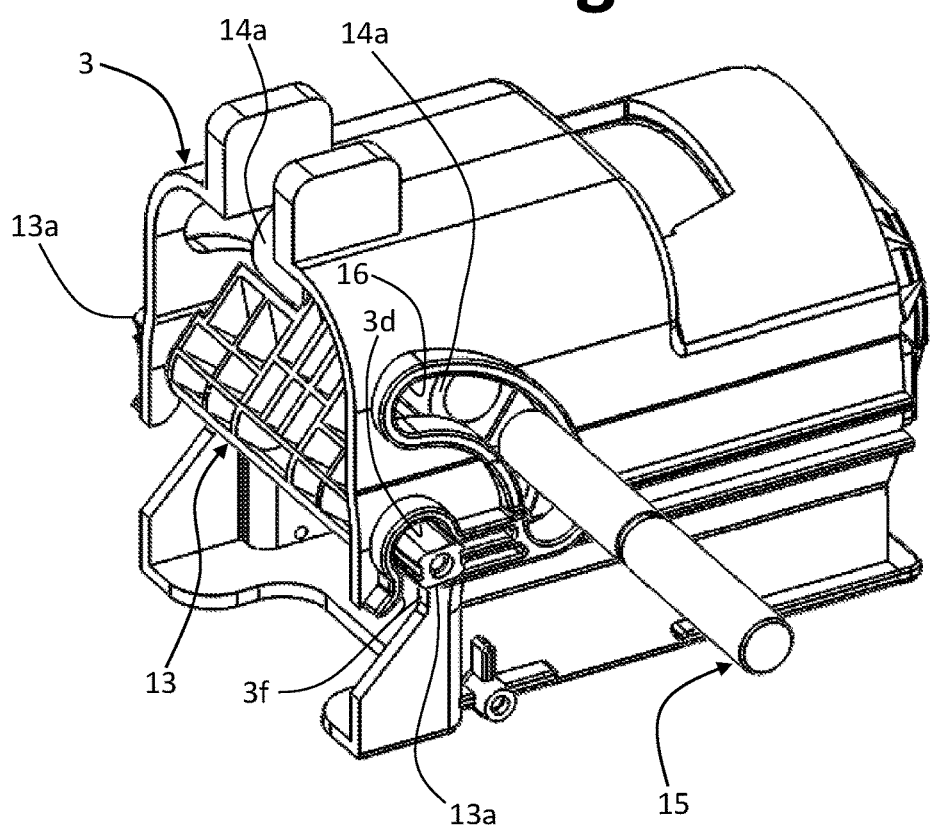
FIG. 21 is a schematic perspective view similar to those of FIGS. 13, 15, 17, and 19, which regards a further step of the method of assembly.

FIGS. 19-20 illustrate, instead, the condition that is obtained following upon an angular displacement of the rocker 13 suitable for enabling its coupling with the connecting-rod member 14. The pins 13*a* hence rotate within the corresponding seats 3*d* until the rocker 13 assumes an angular position such that the eyelets of its portion 13*b* are aligned to the eyelets of the portion 14a of the connecting-rod member. In such an angular position, the eyelets of the aforesaid two portions are also aligned to the guides 16 of the side walls so that the pin 15 can be slid through them transversely so as to articulate the rocker 13 and the connecting-rod member 14 with respect to one another, as exemplified in FIG. 21. The pin 15 can then be blocked in position, for example via a stop ring in an intermediate position (not represented), for example a circlip or the like.

It will be appreciated that, in the assembled condition of the assembly 2, the rocker 13 can oscillate in an angular range determined by the guide slits 16, and the predetermined position that enables passage of the pins 13a through the passages 3f is not comprised in this angular range. This means that, in normal use of the assembly 2, the pins 13a can never slide out of the rotation seats 3d transversely with respect to the axis A or in any case engage the passages 3f. As may be seen, then, thanks to the non-circular cross section of the pins 13a and to the presence of the transverse passages 3f, the rocker 13 can be mounted in an extremely simple and fast way on the casing 3 via operations that are in themselves elementary.

Figure 3:
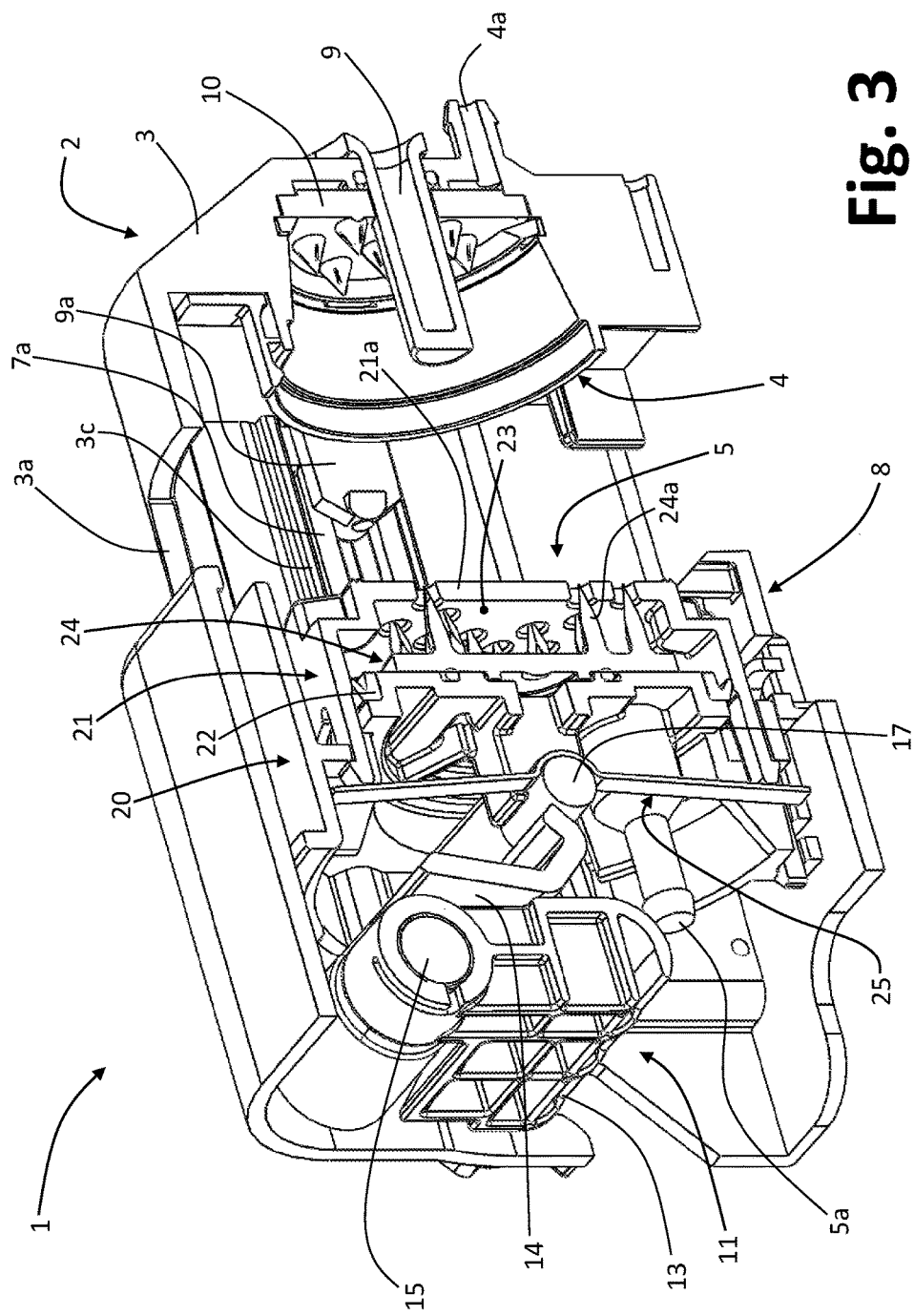
FIGS. 3 and 4 are partially sectioned schematic perspective views of the machine of FIG. 2 in the aforesaid first condition.
Figure 4:
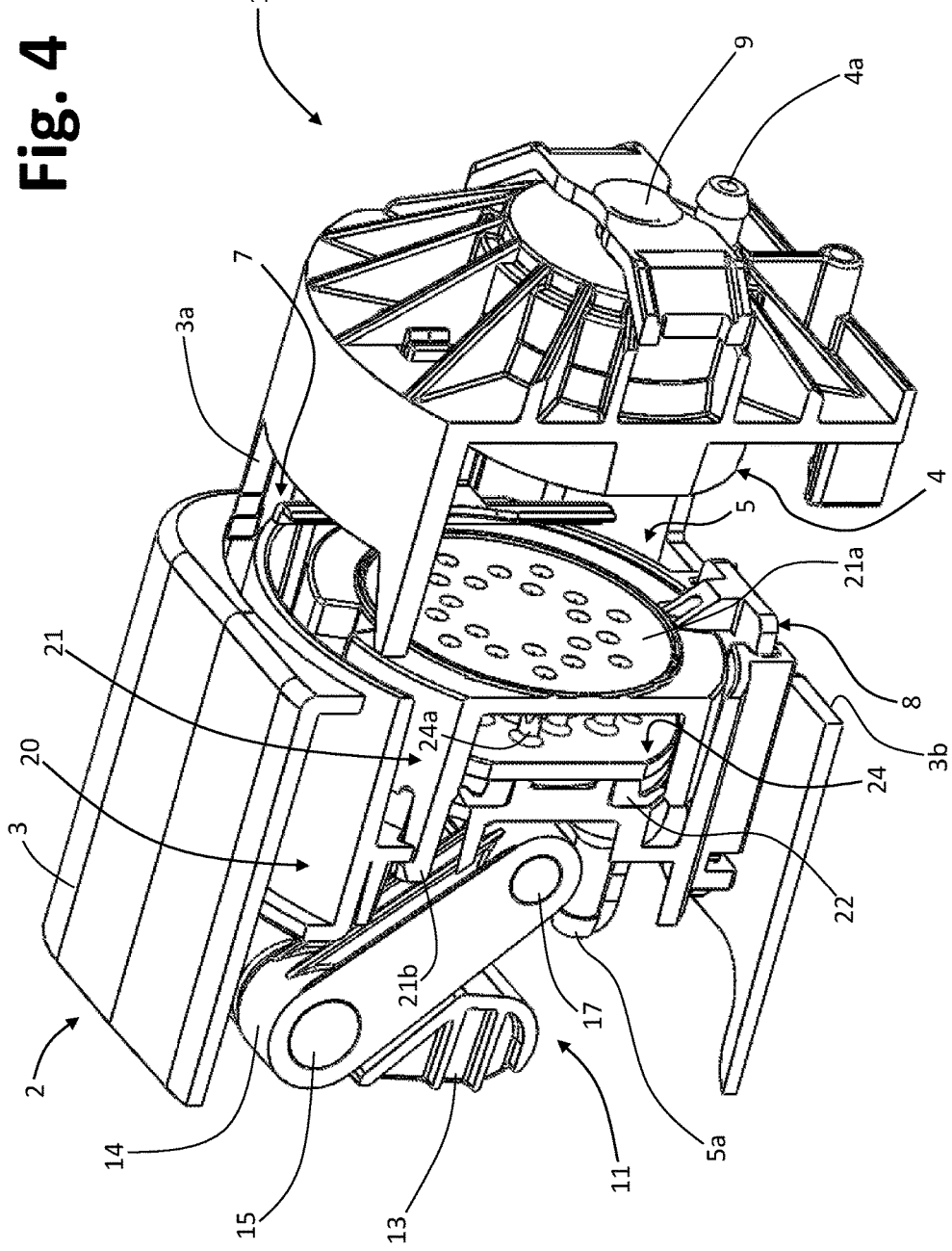

During normal operation of the assembly, the starting condition is the one illustrated in FIGS. 2-4, with the injector 5 in the spaced apart position relative to the capsule-holder 4. A capsule 6 is inserted into the assembly and taken up by the vertical guides 7, until it reaches the position where it is substantially coaxial with the injector and the capsule-holder, determined by the lower support 8. As has been said, the modalities of guiding and withholding of the capsule are irrespective of the purposes of the present invention. Next, the actuation system 11 is actuated for bringing the injector 5 into the position where it is close to the capsule-holder 4. In practice, a rotation is imparted on the rocker 13 in a clockwise direction (as viewed in FIGS. 2-4) until it is brought into the position of FIGS. 6-7. In this step, the rocker 13 is constrained to the rotation about the axis A, thanks to the coupling between the pins 13a and the corresponding seats 3d. The angular movement allowed for the rocker 13 is determined by the arc-shaped guides 16, within which the ends of the pin are engaged. As has been said, the predefined angular position that enables displacement of the pins 13a in the passages 3f is not comprised in the angular range determined by the guides 16.

Oscillation of the pin 15 from its top dead centre to its bottom dead centre (imposed by the top and bottom ends of the guides 16) causes roto-translational motion of the connecting-rod member 14 according to the movable axis B. The injector 5, articulated via the pin 17 to the connecting-rod member 14, thus translates linearly along the respective guides 3c as far as the position close to the capsule-holder 4, i.e., the position of closing of the preparation chamber of the assembly 2 (visible in FIGS. 6-7). After preparation of the liquid product, which occurs with modalities in themselves known, the actuation system 11 is actuated in a direction opposite to the previous one. The injector 5 is then caused to recede, until it returns again into the position of opening of the preparation chamber, as represented in FIGS. 2-4. Also the modalities of ejection of the spent capsule from the delivery assembly 2 are irrespective of the purposes of the present invention.

As has been seen, in the position where the injector 5 and the capsule-holder 4 are close to one another, the ends of the connection pin 15 are at a bottom of the corresponding guides with arc-shaped development 16. According to an aspect that is in itself autonomously inventive, in this position, the movable axis of rotation B of the actuation system 11 is located at a lower height than the fixed axis of rotation A. This characteristic may, for example, be appreciated from a comparison between FIGS. 2 and 6, and in particular from FIG. 6, where it may be noted, with reference to the axis of translation X of the assembly 2, how the movable axis of rotation B is in a position lower than the fixed axis of rotation A. In this position, the axes of the rocker 13 and of the member 14 (designated by $13_1$ and $14_1$ in FIG. 7) form with respect to one another an angle different from 180° (it should be noted, instead, that FIG. 1 illustrates a situation that is obtained at an instant immediately prior to reaching of the end-of-travel position, where the ends of the pin 15 have not yet reached the bottom of the guides 16, with the aforesaid axes $13_1$ and $14_1$ substantially coinciding with one another and with the axis X).

The above characteristic is particularly advantageous from the mechanical standpoint. The particular lower position of the axis B with respect to the axis A enables, during the step of preparation and delivery of the liquid product, discharge on the casing 3 of the forces that stress the kinematic arrangement, only via the pin 15 that rests in the guides 16. With this positioning also any accidental opening is prevented between the parts 4 and 5 of the preparation chamber, i.e., undesired recession of the injector 5 just when, on account of injection of the preparation fluid under pressure, the injector itself is under more pressure to move away from the capsule-holder 4. It will consequently be appreciated that, with the actuation system proposed, the rocker 13 performs only functions of movement of the actuation mechanism 11, without having to withstand significant mechanical stresses.

From the foregoing description, the characteristics of the present invention emerge clearly, as likewise its advantages. According to a first aspect, assembly of the rocker is extremely simple and fast, thanks to the non-circular geometry of its pins and to the presence of the purposely provided transverse passages of insertion, these passages being exploited only during assemblage of the assembly (and possibly during maintenance in the case where removal of the rocker were to become necessary). According to a second aspect, thanks to the positioning of the movable axis of the assembly lower down than the fixed axis, in the position of closing of the preparation chamber no mechanical stresses that arise during preparation or delivery of the liquid product are discharged on the rocker, with the rocker itself that performs practically only functions of movement of the actuation system.

Without prejudice to the principle of the invention, the details of construction and the embodiments may vary, even significantly, from what has been illustrated herein purely by way of non-limiting example, without thereby departing from the scope of the invention as defined in the annexed claims.

In the embodiment illustrated, the arc-shaped guides 16 are arranged for enabling a movement of the pin 15, i.e., of the axis of rotation B, from above downwards, to enable passage from the position of opening to the position of closing of the preparation chamber. In this case, in the opening position the pin 15 occupies the upper ends of the guides 16, whereas in the closing position the pin 15 occupies the lower ends of the guides 16. It will be appreciated, however, that the arrangement of the guides 16 could be reversed with respect to the case exemplified; i.e., they could be arranged for enabling a movement from beneath upwards of the pin 15, i.e., of the axis of rotation B, to enable passage from the opening position to the closing position (in particular with an arrangement of the guides 16 substantially specular in a vertical direction, i.e., turned upside down with respect to the one represented). In this variant, then, in the opening position, the pin 15 occupies the lower ends of the guides 16, whereas in the closing position the pin 15 occupies the upper ends of the guides 16. For such a case, evidently, in the position where the injector and the capsule-holder are close to one another, and hence with the ends of the pin 15 in a position corresponding to the upper ends of the guides 16, the movable axis of rotation B will be at a greater height than the fixed axis of rotation A.

In alternative embodiments (not represented), the injector device of the assembly may be stationary (obviously except for its perforated lid), and the capsule-holder may be movable, operated via an actuation system of the type described.

The actuation system of the assembly described may be operated manually or via a suitable actuator, such as an electric motor.

The invention is such as to be usable also in the case of delivery assemblies with roto-translational motion of the corresponding capsule-holder, for example of the type described in WO 2011/015978 A1.

As has been mentioned, not excluded from the scope of the invention is the case where the rotation seats 3d and the transverse passages 3e for insertion of the pins 13a are constituted by blind guides or slots, defined on the inside of the side walls of the casing 3.

The invention claimed is:

1. A machine for the preparation of a liquid product via a capsule, comprising a delivery assembly having:
    a housing structure;
    a preparation chamber, which comprises a first part and a second part, the first part of chamber having a housing configured for receiving at least partially said capsule and enabling delivery of the liquid product from the preparation chamber, the second part of chamber being configured for introducing a preparation fluid into said capsule; and
    an actuation system controllable for causing relative displacements between the first part of chamber and the second part of chamber, between a spaced apart position and a close position,
    wherein the actuation system comprises at least one first transmission member and one second transmission member each having a first connection portion and a second connection portion;
    wherein the first connection portion of the first transmission member includes two coaxial oscillation pins, each oscillation pin being fixed in rotation with respect to the first transmission member and being engaged in a rotation seat, defined on a respective side wall of the housing structure;
    wherein the rotation seats have a surface of rotation with which an external profile of the respective oscillation pin co-operates for defining a fixed axis of rotation of the first transmission member;
    wherein the first connection portion of the second transmission member is connected in an articulated way to the second connection portion of the first transmission member for turning according to a movable axis of rotation, parallel to the fixed axis of rotation, the second connection portion of the second transmission member being connected to one of the first part of chamber and the second part of chamber for causing a displacement thereof;
    wherein the oscillation pins have, in cross section, a non-circular geometry;
    wherein the side walls of the housing structure have, in homologous positions, transverse passages that extend from the rotation seats; and
    wherein the first transmission member is constrained to the second transmission member so as to move in an angular range that does not include an angular position of the first transmission member such that the corresponding oscillation pins can transversely slide out of the rotation seats through said transverse passages.

2. The machine according to claim 1, wherein the first transmission member comprises a rocker, or a transmission member constrained to an oscillation between two fixed positions.

3. The machine according to claim 1, wherein the second transmission member comprises a connecting-rod member, or a transmission member that is able to perform rotational and translational movement.

4. The machine according to claim 1, wherein said angular range is determined by a pair of guides with arc-shaped development, defined in homologous positions on the side walls of the housing structure.

5. The machine according to claim 4, wherein the second connection portion and the first connection portion of the first and second transmission members, respectively, are connected together in an articulated way by means of a first connection pin that identifies the movable axis of rotation, two opposite ends of the first connection pin being each engaged in a respective guide with arc-shaped development.

6. The machine according to claim 5, wherein the guides with arc-shaped development are through slits in the side walls of the housing structure.

7. The machine according to claim 1, wherein the second connection portion of the second transmission member is connected in an articulated way to one of the first part of chamber and the second part of chamber, the second part of chamber being constrained to a linear reciprocating movement within the housing structure.

8. The machine according to claim 7, wherein the second connection portion of the second transmission member is connected in an articulated way to one of the first part of chamber and the second part of chamber via a second connection pin, two opposite ends of the second connection pin projecting on opposite sides of a body of one of the first part of chamber and the second part of chamber and being constrained directly or with interposition of corresponding sliding members in respective linear guides, defined in the side walls of the housing structure.

9. The machine according claim 1, wherein:
    the movable axis of rotation is displaceable from above downwards to enable passage of the first and second parts of chamber into the close position, and in said close position the movable axis of rotation is at a lower height than the fixed axis of rotation; or else
    the movable axis of rotation is displaceable from beneath upwards to enable passage of the first and second parts of chamber into the close position, and in said close position the movable axis of rotation is at a greater height than the fixed axis of rotation.

10. The machine according to claim 1, wherein the transverse passages have a dimension of width that is at least slightly greater than a dimension of width of the oscillation pins of the first transmission member.

11. The machine according to claim 1, wherein the preparation fluid is water under pressure.

12. The machine according to claim 1, wherein the preparation fluid is steam under pressure.

13. The machine according to claim 1, wherein the preparation fluid is water and steam under pressure.

14. A method for assembling a delivery assembly for a machine for the preparation of a liquid product via a capsule, the method comprising the steps of:
- a) providing a housing structure for the delivery assembly;
- b) providing in the housing structure a preparation chamber, which comprises a first part of chamber, having a housing configured for receiving at least partially said capsule and enabling delivery of the liquid product from the preparation chamber, and a second part of chamber, configured for introducing a preparation fluid into said capsule; and
- c) associating to the housing structure an actuation system that can be actuated for causing relative displacements between the first part of chamber and the second part of chamber, between a spaced apart position and a close position, the actuation system comprising at least one first transmission member and one second transmission member, wherein step a) comprises the operation of:
- a1) forming in homologous positions on two generally parallel side walls of the housing structure two rotation seats, each defining a surface of rotation;

wherein step c) comprises the operations of:
- c1) forming a first connection portion of the first transmission member with two coaxial oscillation pins, each oscillation pin being fixed in rotation with respect to the first transmission member and having, in cross section, a non-circular geometry;
- c2) inserting the oscillation pins into the rotation seats in such a way that an external profiles of the oscillation pins co-operate with the surfaces of rotation of the rotation seats for defining a fixed axis of rotation for the first transmission member; and
- c3) connecting in an articulated way a first connection portion of the second transmission member to a second connection portion of the first transmission member for enabling a rotation of the second transmission member about a movable axis of rotation, parallel to the fixed axis of rotation, and connecting a second connection portion of the second transmission member to one of the first part of chamber and the second part of chamber;

wherein operation a1) comprises forming on the side walls of the housing structure, in homologous positions, passages for inserting transversely into the rotation seats the oscillation pins of the first transmission member;

wherein operation c2) comprises setting the first transmission member in a predefined angular position with respect to said transverse passages, in which position the oscillation pins can be inserted into the corresponding transverse passages and can be displaced therein until they occupy the rotation seats;

and wherein, following upon step c3), the first transmission member is constrained to move in an angular range that does not include said predefined angular position.

15. A machine for the preparation a liquid product via a capsule, comprising a delivery assembly having:
- a housing structure;
- a preparation chamber, which comprises a first part and a second part, the first part of chamber having a housing configured for receiving at least partially said capsule and enabling delivery of the liquid product from the preparation chamber, the second part of chamber being configured for introducing a preparation fluid into said capsule; and
- an actuation system controllable for causing relative displacements between the first part of chamber and the second part of chamber, between a spaced apart position and a close position;

wherein the actuation system comprises at least one rocker and one connecting-rod member, each having a first connection portion and a second connection portion;

wherein the first connection portion of the rocker includes two coaxial oscillation pins, each oscillation pin being fixed in rotation with respect to the rocker and being engaged in a rotation seat, defined on a respective side wall of the housing structure;

wherein the rotation seats have a surface of rotation with which an external profile of the respective oscillation pin co-operates for defining a fixed axis of rotation of the rocker;

wherein the second connection portion and the first connection portion of the rocker and of the connecting-rod member, respectively, are connected in an articulated way by means of a first connection pin for turning according to a movable axis of rotation, parallel to the fixed axis of rotation;

wherein two opposite ends of the first connection pin are engaged in respective guides with arc-shaped development, defined in homologous positions on the side walls of the housing structure, the guides with arc-shaped development determining an angular range of oscillation of the rocker;

wherein the second connection portion of the connecting-rod member is connected in an articulated way to one of the first part of chamber and the second part of chamber, the second part of chamber being constrained to a linear reciprocating movement within the housing structure;

wherein, in the close position, the ends of the first connection pin are at a bottom of the corresponding guides with arc-shaped development; and wherein the first connection pin is displaceable from above downwards, or else from beneath upwards, respectively, to enable passage of the first and second parts of chamber into the close position, and in said close position the movable axis of rotation being at a lower height, or else at a greater height, respectively, than the fixed axis of rotation.

16. The machine according to claim 15, wherein the preparation fluid is water under pressure.

17. The machine according to claim 15, wherein the preparation fluid is steam under pressure.

18. The machine according to claim 15, wherein the preparation fluid is water and steam under pressure.

* * * * *